(No Model.) 4 Sheets—Sheet 1.

F. A. RATHBUN.
WHEELED SCRAPER.

No. 401,658. Patented Apr. 16, 1889.

Witnesses
Geo. W. Young
Wm Klug

Inventor,
Frank A. Rathbun
By Underwood
Attorneys

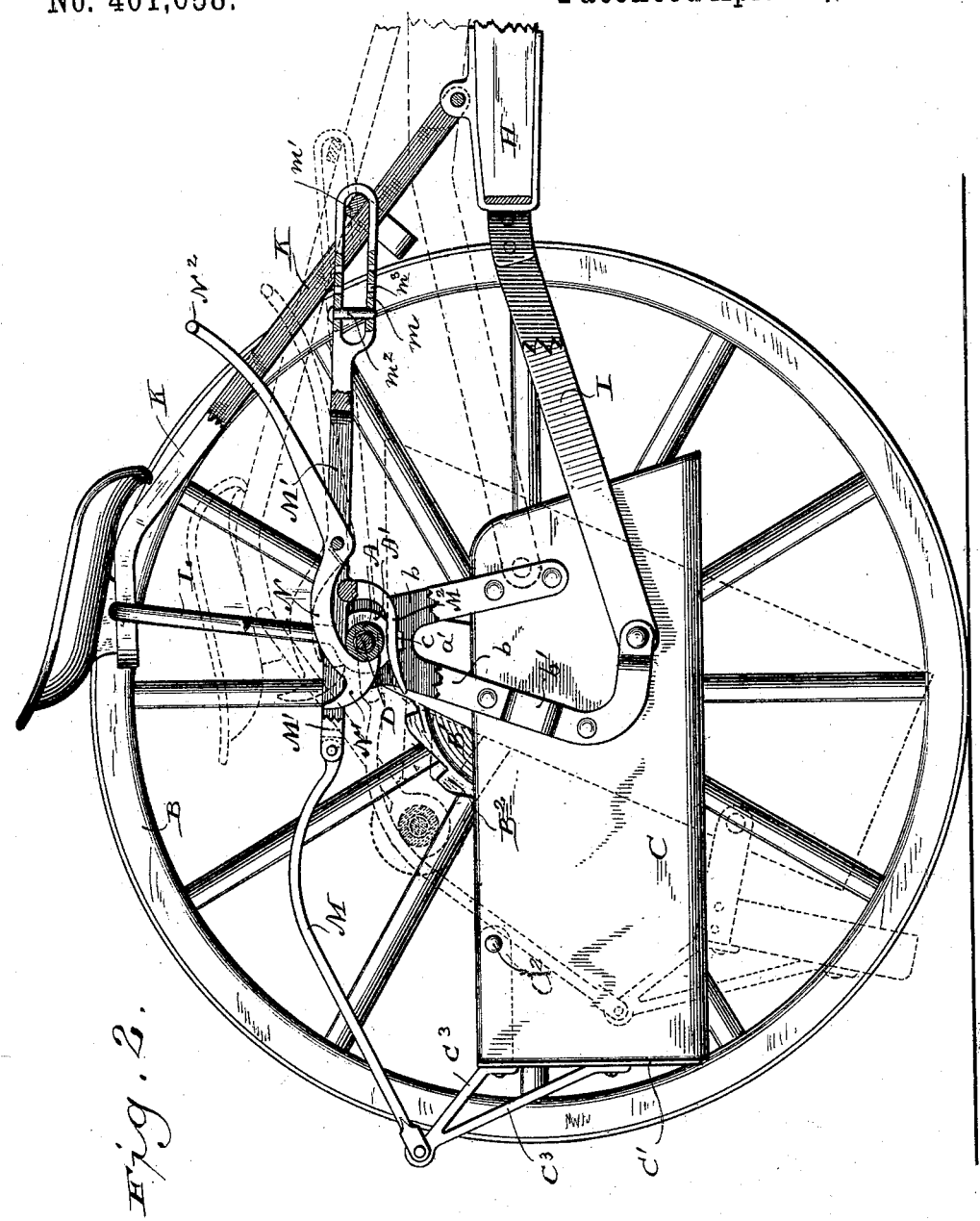

(No Model.) 4 Sheets—Sheet 3.
F. A. RATHBUN.
WHEELED SCRAPER.
No. 401,658. Patented Apr. 16, 1889.
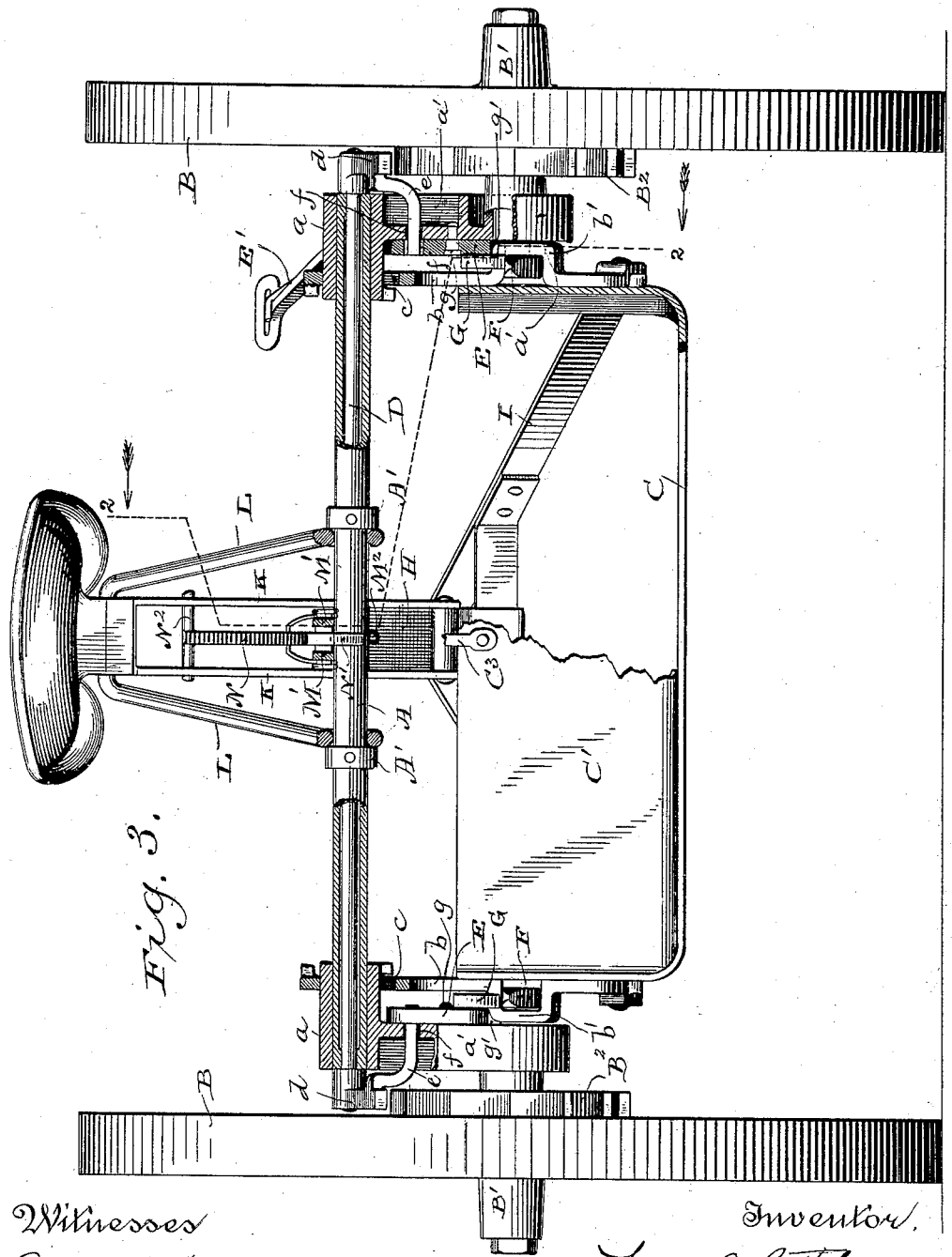
Witnesses
Geo. W. Young.
Wm Klug
Inventor
Frank A. Rathbun
By Fint & Underwood
Attorneys (No Model.) 4 Sheets—Sheet 4.

F. A. RATHBUN.
WHEELED SCRAPER.

No. 401,658. Patented Apr. 16, 1889.

Witnesses.
Geo. W. Young
Wm Klug

Inventor
Frank A. Rathbun
By Stout & Underwood
Attorneys

UNITED STATES PATENT OFFICE.

FRANK A. RATHBUN, OF BELOIT, ASSIGNOR TO THE RATHBUN MANUFACTURING COMPANY, OF MILWAUKEE, WISCONSIN.

WHEELED SCRAPER.

SPECIFICATION forming part of Letters Patent No. 401,658, dated April 16, 1889.

Application filed June 21, 1888. Serial No. 277,802. (No model.)

*To all whom it may concern:*

Be it known that I, FRANK A. RATHBUN, of Beloit, in the county of Rock, and in the State of Wisconsin, have invented certain new and useful Improvements in Wheeled Scrapers; and I do hereby declare that the following is a full, clear, and exact description thereof.

My invention relates to ditchers and scrapers, and will be fully described hereinafter.

Figure 1:
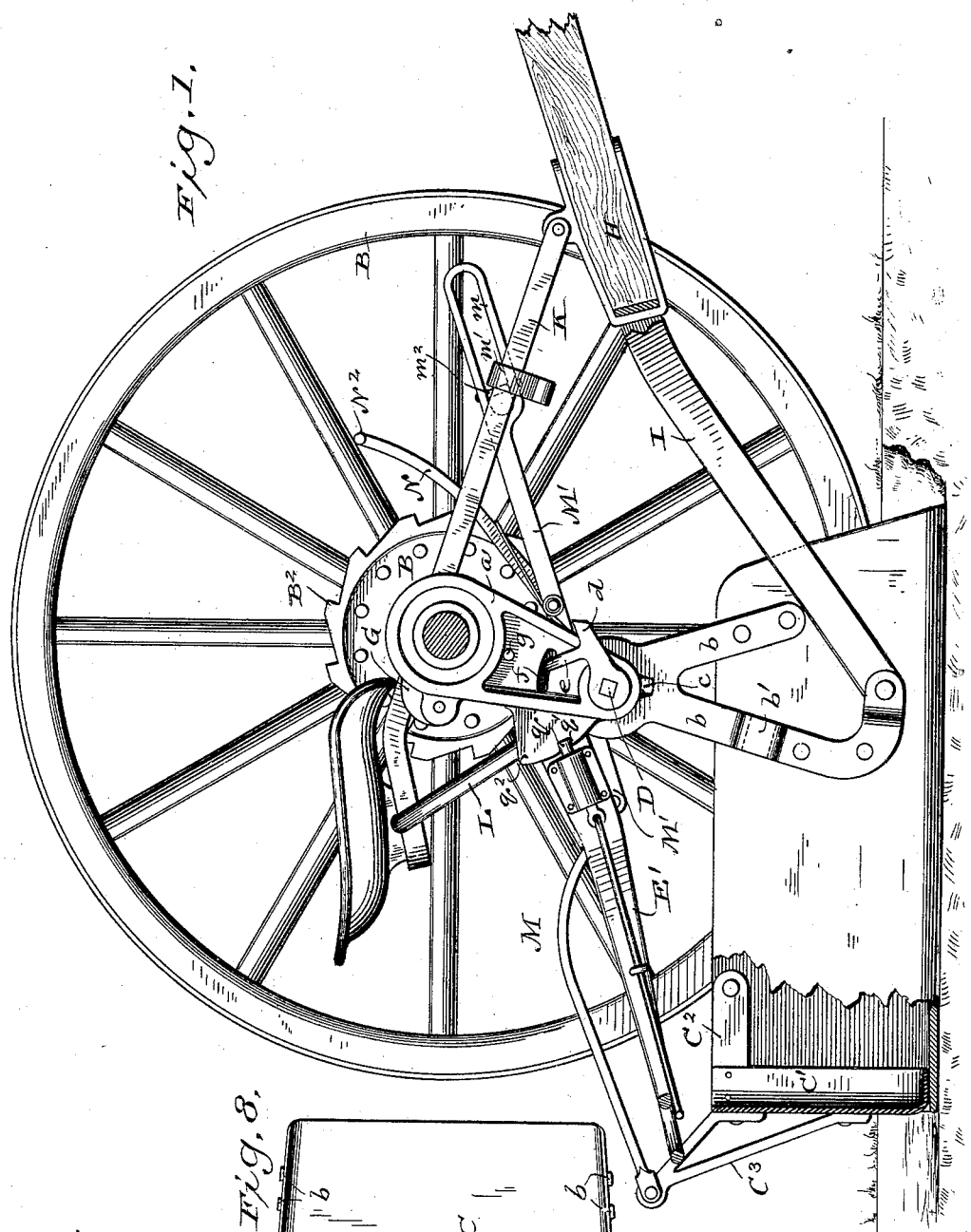
Figure 8:
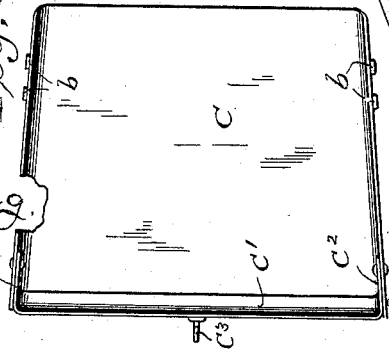
Figure 6:
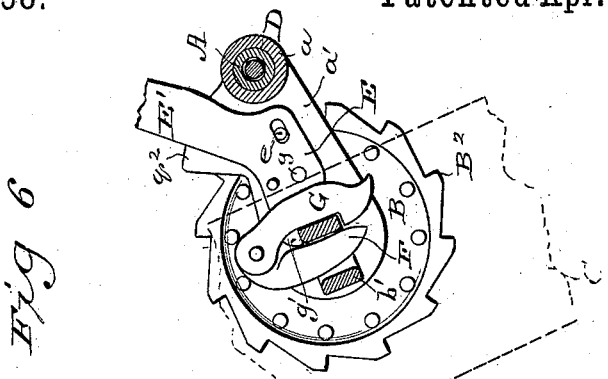
Figure 5:
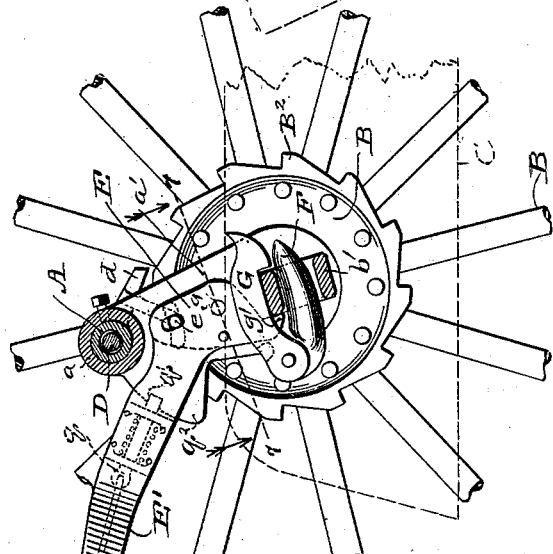
Figure 7:
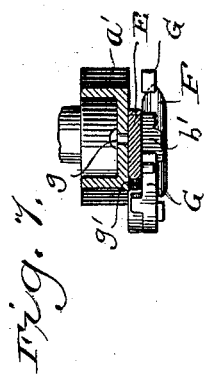
Figure 4:
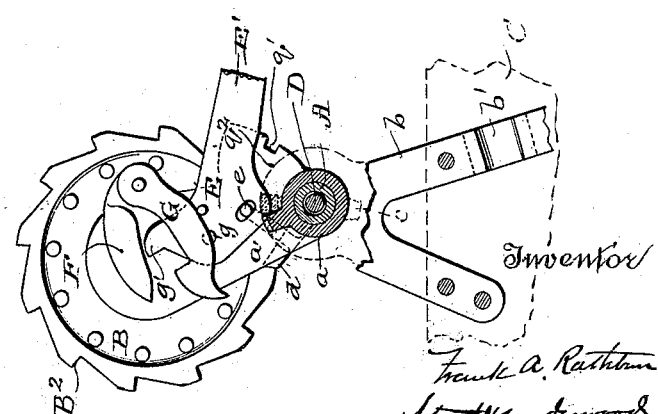

In the drawings, Figure 1 is a side elevation of my invention with one wheel removed and the machine in working position; Fig. 2, a section on line 2 2, Fig. 3, showing by dotted lines the dumping position; Fig. 3, a rear elevation of machine in carrying position; Fig. 4, a detail of the lifting mechanism in working position; Fig. 5, a detail of the same in carrying position; Fig. 6, a detail of the same in dumping position; Fig. 7, a detail section on line 7 7, Fig. 5; Fig. 8, a plan of scraper.

A is a hollow crank-axle, the wrist-pins of which form the journals on which the wheels B B are loosely mounted.

C is the scoop, which is hung to the hubs $a$ of the crank-arms $a'$ of the axle A by straps $b$ $b$, the upper ends of which are formed with openings $c$, through which the hubs pass.

A rock-shaft, D, is fitted in axle A, and this shaft carries a pawl, $d$, on each end, and each pawl $d$ has an arm, $e$, that extends through a horizontal slot, $f$, in the adjacent crank-arm $a'$, and thence through a vertical slot, $f'$, in an elbow of a lever, E. One of the levers E is formed with a handle, E', but the other lever E has no handle. Each lever E is pivoted to the adjacent crank-arm $a'$ at $g$, and each has a lip, $g'$, for engagement with an edge of one of the loops $b'$ of one of the straps $b$. A prong, F, is rigidly secured to or cast with the crank-arm $a'$ of each wheel, and to the secured end of each of these prongs is pivoted a latch, G, having a curved head, which, when the prong F on each side enters the loop $b'$ of the strap $b$ on that side, slides over the loop $b'$ and confines it up against the lip of adjacent lever E, as shown in Fig. 5, which figure shows the position of the parts when the scoop C is lifted from the ground. The pawls $d$ of rock-shaft D are designed for engagement with teeth $B^2$ of the hub B' when the force of the revolving wheels is to be brought into play to lift the scoop from the ground, as will be further described hereinafter.

The front end of the scoop is connected with the tongue H by a bail, I, the ends of which are pivoted to the lower ends of the strap $b$, and the seat is supported by a double strut, K, that is hinged at its front end to the tongue and at its rear is supported by an inverted-U-shaped standard, L, the middle of which works loosely between the upper end of the strut and the seat, while its ends are loosely looped around sleeve A, between collars A'.

The door C' of scoop C is hinged to it near its top by arms $C^2$ and has an arm, $C^3$, which is connected by a curved bail, M, with a slotted bar, M', which is looped in front at $m$ to engage with the center of foot-rest $m'$. A lever, N, that has a latch-head, N', on its lower end and a foot-rest, $N^2$, on its upper end, is pivoted in bar M' and is designed to catch over the sleeve A when the door C' is closed and prevent it from opening. A guide-finger, $M^2$, that projects rearwardly from the under side of the bar M, serves to insure the action of the catch-head, which latter also locks the axle in its highest position, as shown in Fig. 2.

The operation of my device is as follows: When the scoop is down, as shown in Fig. 1, the crank-arms of the axle point downward, the pawl $q$ of lever-handle E' engages a notch, $q'$, in a curved flange, $q^2$, that projects from the rear of the crank-arm, and the lever E is held thereby in such position as to cause it to press on pin $e$, and through it to hold pawls $d$ out of the path of the teeth on the hubs of the wheels, which latter revolve as the machine travels without disturbing the scoop. Now, when the scoop has been filled and is to be lifted, the pawl $q$ is withdrawn and the lever E is depressed, so that through finger $e$ and adjacent pawl $d$ it turns rock-shaft D slightly, and the two pawls $d$ are moved into engagement with the teeth of the hub, so that as the wheels turn forward the teeth of the hubs acting on the pawls will carry the crank-arms backward and upward until they pass over the dead-center, when the axle will wedge under the head of catch-lever N, where it will be caught and held until the front end of lever N is depressed, as will hereinafter be described, and as the arms rise each of the loops $b'$ will drop in between one of the prongs F and its opposing latch G, as shown in Fig. 6, and lock the crank-arms and loops $b'$ together, while the arms are carried by the wheels over to the position shown in Fig. 5, the driver in the meantime, as the arms passed over the dead-center, having lifted the lever E until its pawl again engages notch $q$ of flange $q'$, so as to lift pawls $d$ out of engagement with the teeth B. The wheels will now be free to turn independently of the machinery, and the load may be transported to the dumping-place, and the scoop is dumped as follows: The driver first depresses the long arm of lever N, thus releasing the axle and permitting the weight of the rear end of the scoop to tip the axle over backward, when the scoop assumes the position shown in dotted lines, Fig. 2, with its door held open by the bar M, and after the scoop has been emptied it is righted by drawing upward and forward on lever E until the axle is again brought into engagement. The scraper may now be drawn back for another load, and then the scoop is dropped in the following manner: The handle of lever E is grasped and the pawl $q$ drawn out of notch $q'$, and then the lever is drawn backward, causing its lip $g'$ to engage lug $g^2$ on latch G and lift the same out of engagement with loop $b'$, and also to pull the axle backward beyond the dead-center until latch G clears the loop $b'$, when the pan of its own weight would drop to the ground by drawing the crank-arms back to their lowest position; but in order to prevent a sudden descent of the pan the lever E should be thrust forward until pawls $d$ engage the teeth B, and the horses should be slowly backed to let the crank-arms go back easily.

The sides of the scoop are inclined toward each other from rear to front to give the greatest weight to the rear of the scoop and to prevent wedging of the dirt as it enters the scoop as well as to facilitate dumping.

The seat-supports K and L, it will be noticed, form a toggle-lever between the axle and tongue H, and in the act of dumping the weight in the seat has a tendency to separate the supports K and L from each other, bringing the entire force of the toggle action to bear on the axle to force it back, as shown in dotted lines, Fig. 2, thus rendering the dumping operation easy and certain.

When the scoop is drawn, as in Fig. 1, the weight in the seat has the effect through support L of forcing the axle forward, and thus depressing the nose of the scoop, and to prevent the nose from going too deep I provide a pin, $m^2$, which fits in holes $m^3$ in the loop $m$ of bar M, which, by striking foot-rest $m'$, restrains the forward movement of the axle.

Having thus fully described my invention, what I claim as new, and desire to secure by Letters Patent, is—

1. In an earth-scraper, the combination, with the wheels and the hubs thereof, the latter having toothed peripheries, of a hollow axle the journals whereof are cranked thereto, a scoop hung from the outer hubs of the cranks, a rock-shaft running through the hollow axle, pawls carried by said rock-shaft for engaging the teeth of the hubs, and a lever and connections for operating the rock-shaft, substantially as described.

2. The combination, with the hollow cranked axle of a scraper and its suspending-straps, the latter hung from the outer hubs of the axle-cranks, of a prong and latch carried by each of the inner hubs of the cranks, and connected levers for operating the latches to cause them to release the loops at the proper time, as set forth.

3. The combination, with the scoop, cranked axle, and wheels having toothed hubs, of straps for suspending the scoop to the axle, a prong and latch for engagement with a loop in each suspending-strap, a rock-shaft extending across the machine, and pawls carried by said rock-shaft, and means for operating the said rock-shaft and latch, substantially as described.

4. In a scraper, the combination, with the cranked axle and the rock-shaft running through it, of levers pivoted each to a crank-arm of the axle, pawls carried by the rock-shaft, one at each end, a toothed hub on each of the wheels, and connections between each of said pawls and the lever adjacent to it, whereby both pawls may be lifted or dropped by a movement of one of the said levers, substantially as described.

5. The combination, with the wheels and their toothed hubs, of a hollow axle cranked to its journals, a rock-shaft and pawls carried thereby, one on each end, a lever pivoted to each crank-arm, an arm extending from each pawl through a slot in the adjacent crank-arm, and another slot in the adjacent lever at substantially a right angle to the slot in the crank-arm, and means for locking one of said levers, substantially as described.

6. The combination, with the cranked axle, of the scoop hung therefrom and a standard pivoted on the axle, a seat pivoted on the standard, and a strut secured to the seat at one end and hinged to the tongue at the other end, and means for locking the axle in its raised position, substantially as described.

7. The combination, with the axle and tongue, of the toggle-support for the seat, and a bar connecting the axle with the foot-rest and serving to limit the forward movement of the axle when the machine is scraping, substantially as described.

8. The combination, with the cranked axle and toggled seat-supports, of the bar M, pin $m^2$, latch-lever N, the scoop and its door, bail I, and tongue H, substantially as described.

In testimony that I claim the foregoing I have hereunto set my hand, at Milwaukee, in the county of Milwaukee and State of Wisconsin, in the presence of two witnesses.

FRANK A. RATHBUN.

Witnesses:
S. S. STOUT,
WM. KLUG.